United States Patent
Paragano et al.

(10) Patent No.: US 8,696,794 B2
(45) Date of Patent: Apr. 15, 2014

(54) MICROGRAVITY PASSIVE PHASE SEPARATOR

(75) Inventors: Matthew Vincent Paragano, Southbridge, MA (US); William Indoe, Glastonbury, CT (US); Jeffrey A. Darmetko, East Granby, CT (US)

(73) Assignee: Hamilton Sundstrand Space Systems International, Inc., Windsor Locks, CT (US)

(*) Notice: Subject to any disclaimer, the term of this patent is extended or adjusted under 35 U.S.C. 154(b) by 398 days.

(21) Appl. No.: 13/112,207

(22) Filed: May 20, 2011

(65) Prior Publication Data

US 2012/0291630 A1   Nov. 22, 2012

(51) Int. Cl.
*B01D 53/22* (2006.01)
*B01D 19/00* (2006.01)
*B01D 19/02* (2006.01)

(52) U.S. Cl.
USPC ............... 95/46; 95/242; 96/4; 96/6; 96/9; 96/10; 96/179; 55/428

(58) Field of Classification Search
USPC ............. 95/46, 242; 96/4, 6, 7, 9, 10, 179; 55/428
See application file for complete search history.

(56) References Cited

U.S. PATENT DOCUMENTS

| | | | |
|---|---|---|---|
| 3,631,654 A * | 1/1972 | Riely et al. | 96/6 |
| 3,993,062 A * | 11/1976 | Jess | 96/6 |
| 4,027,494 A | 6/1977 | Fletcher et al. | |
| 4,325,715 A * | 4/1982 | Bowman et al. | 96/6 |
| 5,238,547 A * | 8/1993 | Tsubouchi et al. | 96/6 |
| 5,474,688 A | 12/1995 | Hedrick et al. | |
| 5,564,067 A | 10/1996 | Hendricks | |
| 5,693,125 A | 12/1997 | Dean | |
| 5,769,926 A | 6/1998 | Lokhandwala et al. | |
| 6,547,862 B2 | 4/2003 | Dean | |
| 6,579,457 B1 * | 6/2003 | Ehrnsperger et al. | 96/6 |
| 6,610,122 B1 | 8/2003 | Filburn et al. | |
| 7,141,100 B2 | 11/2006 | Dean | |
| 7,238,224 B2 * | 7/2007 | Kent | 95/46 |
| 7,578,870 B2 | 8/2009 | Dean | |
| 7,611,568 B2 * | 11/2009 | Kang et al. | 96/4 |
| 7,753,991 B2 | 7/2010 | Kertzman | |
| 2010/0107878 A1 * | 5/2010 | Crowder et al. | 96/6 |
| 2010/0234824 A1 * | 9/2010 | Christoph et al. | 96/6 |

* cited by examiner

*Primary Examiner* — Jason M Greene
(74) *Attorney, Agent, or Firm* — Carlson, Gaskey & Olds, P.C.

(57) ABSTRACT

A passive phase separator separates and traps gases that may be present in a liquid flowing through a system. The phase separator includes an inlet in fluid communication with a first separator chamber and an outlet in fluid communication with a second separator chamber that is disposed annularly about the first separator chamber. Gas introduced into the first separator chamber is pushed downstream through the first separator chamber to a gas storage chamber. Once gas is trapped within the gas storage chamber it remains there for the entire operational life of the phase separator.

21 Claims, 4 Drawing Sheets

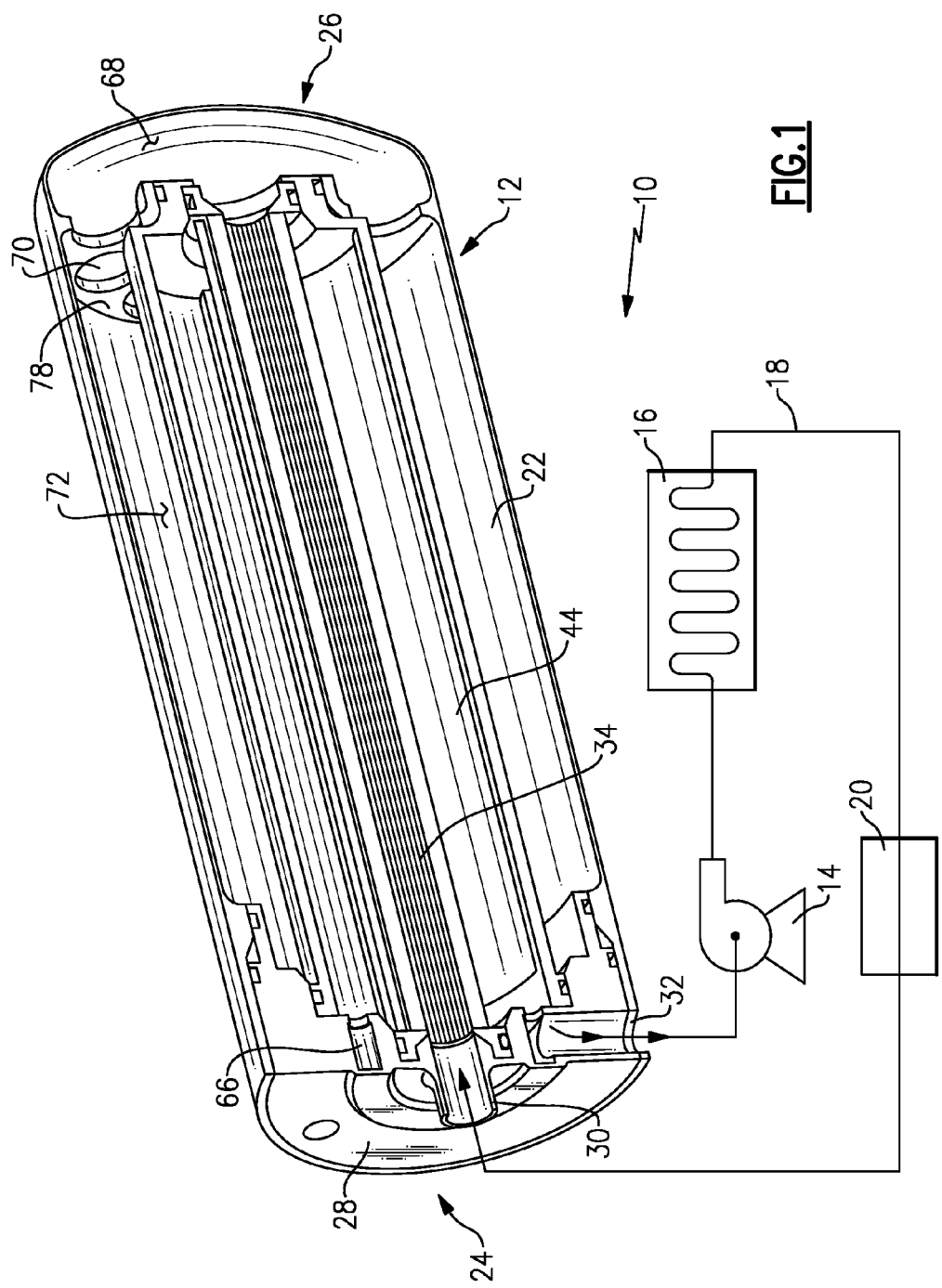

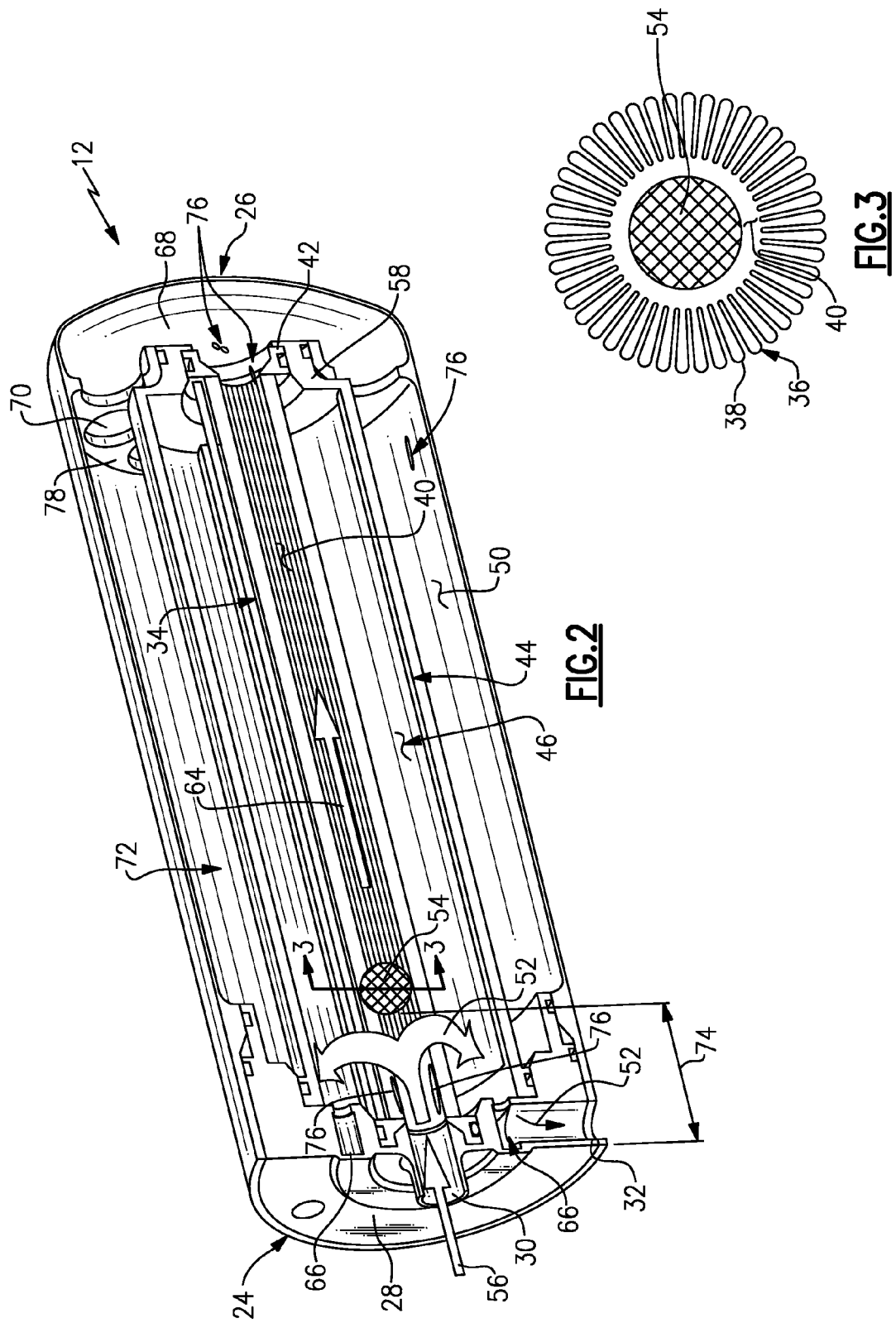

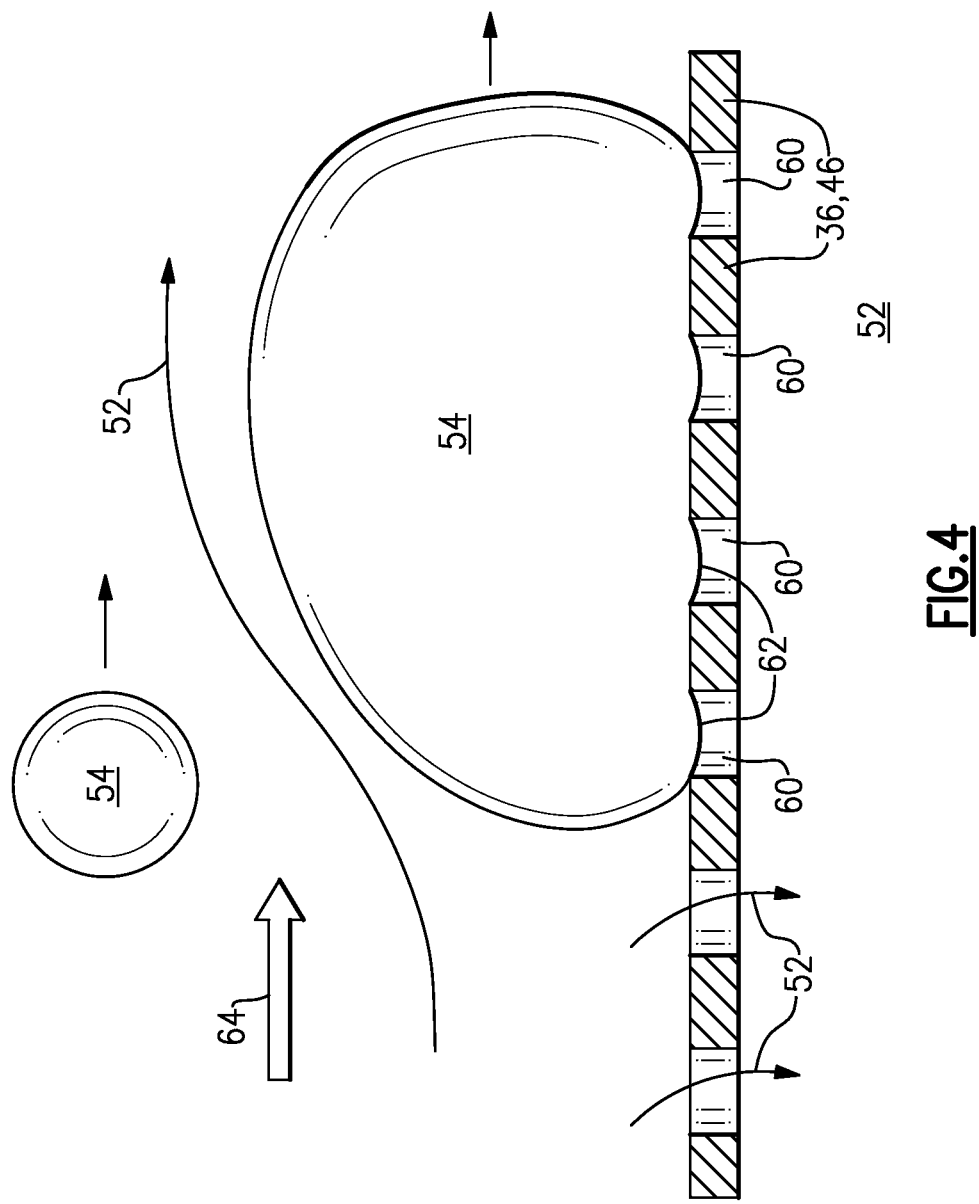

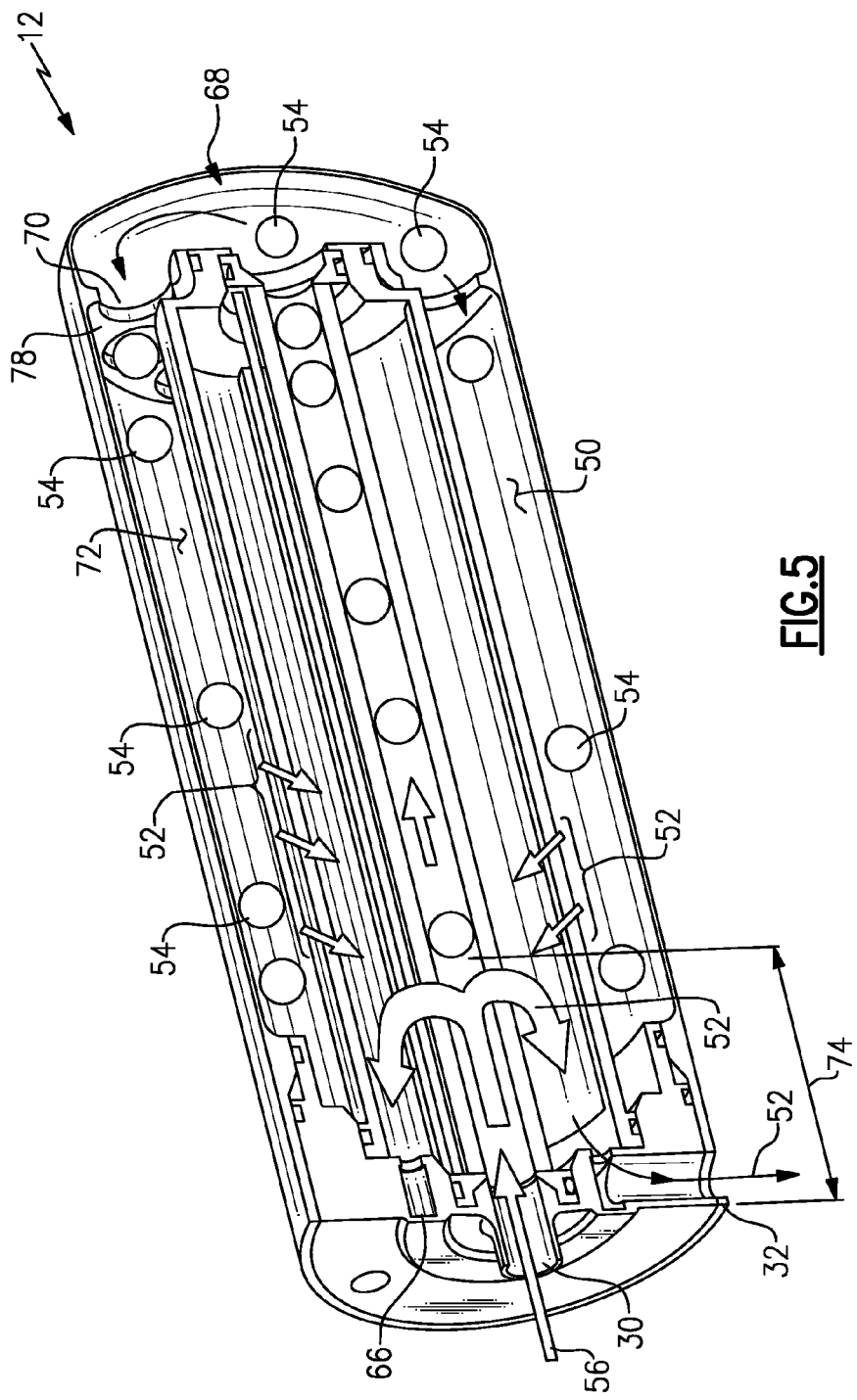

MICROGRAVITY PASSIVE PHASE SEPARATOR

STATEMENT REGARDING FEDERALLY SPONSORED RESEARCH OR DEVELOPMENT

The subject of this disclosure was made with government support under Contract No.: NNJ06TA25C awarded by the National Aeronautics and Space Administration. The government therefore may have certain rights in the disclosed subject matter.

BACKGROUND

This disclosure generally relates to a phase separator for removing gas from a liquid. More particularly, this disclosure relates to a phase separator for passively removing gas from a liquid in a microgravity environment.

Systems aboard a vehicle operating in microgravity environments experience phenomena not encountered under normal gravity conditions. In microgravity environments, gas does not freely separate from liquid and agglomerate due to the absence of buoyant forces. Accordingly, additional features are required to remove unwanted gas from liquid systems. A powered phase separator can be utilized in such an environment for removing gas from the liquid. A powered phase separator typically includes a motor driven drum that rotates to generate a centripetal acceleration that drives the liquid to an outermost region while exhausting gas that accumulates from an inner region. Membrane-based separators, which rely on a higher concentration of gas in the device than outside to drive gas flow out, invariably result in loss of liquid by the same mechanism as gas transport. Membrane-based separators may also require complexity in the form of a fan or blower to move exhausted gas, a sweep-gas supply, and additional valves. All other separator devices require some minimum level of control features that undesirably add to the complexity of the device.

SUMMARY

A disclosed example passive phase separator provides for the separation and trapping of gas bubbles that may be present in a liquid flowing through a liquid circulation system. The phase separator includes an inlet in fluid communication with a first separator chamber and an outlet in fluid communication with a second separator chamber that is disposed annularly about the first separator chamber.

The first separator chamber defines a fluid passage from the inlet towards a gas storage chamber. The walls of the first separator chamber are formed from a pleated stainless steel filter cloth that includes a plurality of openings sized to provide for the migration of liquid but not of gas. The selective transport of liquid rather than gas across the openings is provided utilizing surface tension of the liquid and wetting qualities of the walls of the passage. The gas-liquid boundary that forms along the walls prevents the migration of gas through the walls due to the surface tension of liquid. Incoming liquid flows parallel to the walls and perpendicular to the openings. Gas bubbles introduced into the first separator chamber are pushed downstream through the passage to a gas storage chamber. Once gas is trapped within the gas storage chamber it remains there, completely isolated from the exiting liquid flow in the second separator chamber, for the entire operational life of the phase separator.

Accordingly, the disclosed passive phase separator separates gas from a liquid flow without the use of external devices or the creation of centripetal acceleration. Moreover, the separation of gases does not require venting or any other external devices or system to accomplish the removal of gas bubbles from the liquid flow.

These and other features disclosed herein can be best understood from the following specification and drawings, the following of which is a brief description.

BRIEF DESCRIPTION OF THE DRAWINGS

FIG. 1 is a schematic view of an example fluid system including an example passive phase separator.

FIG. 2 is a schematic view of liquid and gas flow into the example passive phase separator.

FIG. 3 is a cross-section through a portion of the example phase separator.

FIG. 4 is enlarged cross-sectional view of a portion of a wall of the example passive phase separator.

FIG. 5 is a schematic view of liquid flow and gas storage within the example phase separator.

DETAILED DESCRIPTION

Referring to FIG. 1, an example circulating system schematically indicated at 10 includes a passive phase separator 12, a pump 14 and a heat exchanger 16. The pump 14 pumps a two-phase medium through the heat exchanger 16 through a series of conduits 18 and a device 20 and then back through the passive phase separator 12. The example device 20 can include any system, or device that utilizes a two-phase medium for cooling, heating or other desired uses. In this example the two-phase medium comprises a liquid containing gas bubbles. The example liquid circulating system 10 is intended for use in microgravity environments. In such environments, bulk acceleration is very low and therefore any gas bubbles remain dispersed within the liquid due to the absence of strong buoyant forces required to agglomerate the bubbles. The dispersed gas bubbles within the liquid can decrease the operational efficiency of the heat exchanger 16, pump 14, and other devices 20.

The example passive phase separator 12 provides for the separation and trapping of gases that may be present in any liquid flowing through the system 10. The example phase separator 12 includes a housing 22 with a first open end 24 and a second closed end 26. A header assembly 28 is secured to the open end 24 of the housing 22 and defines an inlet 30 and an outlet 32. The inlet 30 is in fluid communication with a first separator chamber 34. The outlet 32 is in fluid communication with a second separator chamber 44. The second separator chamber 44 is disposed annularly about the first separator chamber 34.

Referring to FIGS. 2 and 3, the example phase separator 12 is shown separate from the system 10 for clarity. The example passive phase separator 12 includes the first separator chamber 34 that defines a fluid passage 40 from the inlet 30 towards a gas storage chamber 50. The first separator chamber 34 includes a first end cap 42 that defines an opening into the gas storage chamber 50. A second end cap 58 supports the second separator chamber about the first end cap 42. In this example, the gas storage chamber 50 is disposed at the closed end 26 and annularly about the first and second separator chambers 34, 44. A two-phase mixture including gas and liquid flow indicated at 56 enters the inlet 30 and proceeds through the passage 40 defined by the first separator chamber 34. The gas is in the form of gas bubbles 54 and throughout this specification the term gas and gas bubbles 54 are utilized to describe any part gas phase that is trapped within the liquid.

Referring to FIG. 4, with continued reference to FIGS. 2 and 3, the first separator chamber 34 is defined by walls 36 formed from a stainless steel filter cloth. The stainless steel filter cloth is arranged about the passage 40 and includes a plurality of pleats 38. Each of the pleats 38 extends radially outward perpendicular to a primary direction of fluid flow indicated by the arrow 64.

Liquid 52 is free to migrate through the walls 36 of the first separator chamber 34. This migration of liquid through the walls 36 of the first separator chamber 34 allows liquid to enter the second separator chamber 44. The second separator chamber 44 is disposed annularly about the first separator chamber 34. The walls 46 of the second separator chamber 44 are comprised of a stainless steel filter cloth or similar wettable material. A wettable material is a solid material with high adhesive forces between the liquid and solid and comparatively low liquid cohesive forces such that a liquid drop in contact with the material will spread across the surface with a liquid wetting angle less than 90°. When the liquid is water the wettable material is regarded as hydrophilic. Conversely, a non-wettable surface in contact with water is referred to as being hydrophobic, and can be identified by a contact angle greater than 90°. In this example, the same wettable stainless steel filter cloth is used for the walls 36, 46 of both the first chamber 34 and the second chamber 44. However, different materials could be utilized that provide the desired wetting properties for the user-selected liquid and are within the contemplation of this disclosure.

The pleated stainless steel filter cloth comprising the walls 36, 46 includes a plurality of openings 60 sized to provide for the migration of liquid 52 but not of gas 54. The selective permeability of the first separator chamber 34 is provided utilizing surface tension of the liquid 52 disposed within the passage 40 on the chamber walls 36 and the wettable nature of those walls. The liquid wets the walls 36 and may pass through the openings 60, impeded only by the hydraulic resistance of the liquid though the openings 60. The wetting of the liquid 52 to the inner walls 36 of the first separator chamber 34 is provided as the stainless steel filter cloth is comprised of a wettable material. The wettable material encourages adhesion of the liquid to form an interfacial barrier 62 along the walls 36, 46 in the presence of gas. The motion of the liquid 52 through the walls 36 will drive the gas 54 towards the walls. However, the liquid 52 will maintain an interfacial barrier 62 until the capillary pressure $P_C$ is exceeded, given by:

$$P_C = \frac{2\gamma\cos(\theta)}{r},$$

where

γ is the surface tension of the liquid 52,

θ is the wetting angle of the liquid on the walls 36, 46, and r is the effective pore radius of the opening 60.

Due to the large surface area of the walls 36, 46 relative to the liquid flow rate, the device operates at a differential pressure well below the capillary pressure to prevent accidental gas breakthrough. As the gas 54 is prevented from migrating through the wall 36, it is pushed along the passage 40 defined by the first separator chamber 34 towards the closed end 26 and the gas storage chamber 50.

The wettable nature of the secondary walls 46 also prevents the migration of gas 54 that may be contained within the gas storage chamber 50 therethrough. Accordingly, liquid flow 52 is capable of migrating through the walls 36 of the first separator chamber 34 into the second separator chamber 44. The second separator chamber 44 is in communication with the outlet 32 through which liquid 52 separated from the gas 54 flows. Accordingly, the gas 54 is maintained within the gas storage chamber 50 of the passive phase separator 12 while liquid 52 may pass through the walls 36,46 of the first and second phase separator chambers 34,44 and finally out the outlet 32. In this example, the first separator chamber 34 includes the pleats 38 and the second separator chamber 44 does not, however, it is within the contemplation of this disclosure that both the first and second separator chambers 34, 44, may or may not be pleated. The pleats 38 create additional surface area for the first separator chamber 34.

Gas is prevented from migrating through the walls 36, 46 due to the interfacial barrier 62 that forms along the inner surface of the walls 36, 46. The liquid forms an interfacial barrier 62 that does not allow the penetration of gas 54 therethrough except if the differential pressure across the walls 36, 46 exceeds the capillary pressure for the liquid on the walls. The velocity of liquid through inlet 30 is constrained to prevent a condition where the differential pressure across the walls 36, 46 exceeds the capillary pressure. Accordingly, gas is forced through the passage 40 towards the gas storage chamber 50. Once gas is trapped within the gas storage chamber 50 it remains there for the entire operational life of the phase separator.

Moreover, the stainless steel filter cloth walls 36 also trap any solid particles that may be present within the two-phase mixture 56. As is indicated at 76, particulates that exceed the pore size are trapped on the first separator chamber walls 36. Alternatively, particulates 76 could be drawn through the passage 40 and become trapped within the gas containment chamber 50, or trapped on the second chamber walls 44.

In this example, the outlet 32 includes a single opening through the housing 22 and an annular opening 66 that is defined within the header 28. The first and second separator chambers 34, 44 extend longitudinally within the housing 22 towards the closed end 26. In this example the closed end 26 defines an end portion 68 of the gas storage chamber 50. A plurality of holes 70 provide for gas flow from the end portion 68 into an annular portion 72 of the gas storage chamber 50, while the remaining material 78 provides structural support for the first 34 and second 44 chambers. Gas 54 exiting the passage 40 enters the end portion 68 and migrates through the openings 70 into the annular portion 72 of the gas storage chamber 50 defined about the second separator chamber 44.

Referring to FIGS. 2, 4, and 5, during operation of the example phase separator 12 the liquid gas mixture 56 is pumped through the inlet at a high enough velocity to ensure that the drag force exerted on the gas exceeds the surface tension force adhering the gas to the first separator chamber 34. The liquid 52 is flowed parallel to the walls 36 and perpendicular to the openings 60. Gas introduced into the first separator chamber 34 is pushed downstream through the passage 40 to a flow stagnation point notionally indicated at 74. The flow stagnation point 74 represents an equilibrium position between the surface tension forces adhering the gas to the walls 36 and 46 and drag forces exerted on the gas bubble 54 or where the velocity of the liquid has been reduced to zero. The gas bubble 54 forms a volume depending on the velocity of liquid flow and the cumulative quantity of gas introduced into the phase separator through inlet 30. As an increased level of gas 54 is introduced through the first passage 40 a front will form and move further down the first passage 40 as the velocity of the liquid entering increases. The gas 54 migrates towards the end of the passage 40 and enters the gas storage chamber 50. Gas within the gas storage chamber 50 is trapped until the example passive phase separator 12 is removed from the system 10 or evacuated. In other words, gas trapped within the example passive phase separator 12 remains within the phase separator 12 for the duration of operation. Gas is not vented or exhausted in any way from the phase separator 12.

Accordingly, the example passive phase separator 12 provides for the separation of gas from a liquid flow without the use of external devices or the creation of centripetal acceleration. Moreover, the separation of gases does not require a venting or any other external devices or system to accomplish the removal of gases from a liquid flow.

Although an example embodiment has been disclosed, a worker of ordinary skill in this art would recognize that certain modifications would come within the scope of this disclosure. For that reason, the following claims should be studied to determine the scope and content of this invention.

What is claimed is:

1. A phase separator for separating phases of a two-phase mixture comprising:
   a housing including an inlet and an outlet;
   a first separator chamber within the housing, the first separator chamber including walls of porous material defining a passage from the inlet to a gas storage chamber through which a two-phase mixture of gas and liquid flows; and
   a second separator chamber within the housing, the second separator chamber including walls of a porous material defining a space open to the outlet and disposed about the first separator chamber through which at least some liquid flows to the outlet.

2. The phase separator as recited in claim 1, wherein first separator chamber comprises a pleated tube, with the pleats extending radially outward relative to the direction of liquid flow.

3. The phase separator as recited in claim 1, wherein the second chamber is disposed annularly about the first separator chamber.

4. The phase separator as recited in claim 1, wherein the second chamber comprises a pleated tube with pleats extending radially outward relative to the direction of liquid flow.

5. The phase separator as recited in claim 1, wherein the first separator chamber includes a first end in communication with the inlet and a second end distal from the first end in communication with the gas storage chamber.

6. The phase separator as recited in claim 5, wherein the second separator chamber is open to the outlet and closed to the gas storage chamber.

7. The phase separator as recited in claim 1, wherein the porous material defines a selectively permeable membrane that prevents through gas flow and provides for liquid through flow.

8. The phase separator as recited in claim 1, wherein the porous material comprises a wettable material.

9. The phase separator as recited in claim 1, wherein the porous material comprises a stainless steel filter cloth.

10. The phase separator as recited in claim 1, wherein the gas storage chamber is disposed outside of the second separator chamber and holds gas within the housing.

11. The phase separator as recited in claim 1, wherein the porous material prevents the flow of particulate matter from the inlet to the outlet.

12. A liquid circulation system comprising:
    a pump for circulating liquid flow through a circuit; and
    a phase separator for separating gas from the liquid flow, the phase separator including:
        a housing including an inlet and an outlet, a first separator chamber within the housing, the first separator chamber including walls of porous material defining a passage from the inlet to a gas storage chamber through which a two-phase mixture of gas and liquid flows; and
        a second separator chamber within the housing, the second separator chamber including walls of a porous material defining a space open to the outlet and disposed about the first separator chamber through which at least some liquid flows to the outlet.

13. The liquid circulation system as recited in claim 12, wherein at least one of the first separator chamber and the second separator chamber comprises a pleated tube, with the pleats extending radially outward relative to the direction of liquid flow.

14. The liquid circulation system as recited in claim 12, wherein the second chamber is disposed annularly about the first separator chamber.

15. The liquid circulation system as recited in claim 12, wherein the first separator chamber includes a first end in communication with the inlet and a second end distal from the first end in communication with the gas storage chamber and the second separator chamber is open only to the outlet.

16. A method of removing gas from a two-phase mixture comprising the steps of:
    flowing a two-phase mixture of gas and liquid through a first separator chamber from an inlet toward a gas storage chamber;
    flowing liquid through walls of the first separator chamber into a second separator chamber disposed about the first separator chamber and out an outlet; and
    trapping gas within the gas storage chamber.

17. The method as recited in claim 16, including defining walls of the first separator chamber with a stainless steel filter cloth and flowing the two-phase mixture of gas and liquid parallel to the walls.

18. The method as recited in claim 17, including defining the walls to include a plurality of pleats extending radially outward transverse to the direction of liquid flow.

19. The method as recited in claim 17, wherein the stainless steel filter cloth comprises a wettable material and liquid flow coats the steel filter cloth to prevent gas from flowing through the walls of the first separator chamber.

20. The method as recited in claim 16, including the step of maintaining gas within the gas storage chamber for a predefined operational duration.

21. The method as recited in claim 16, wherein the method is performed in a microgravity environment.

* * * * *